United States Patent [19]
Burkett

[11] 3,901,558
[45] Aug. 26, 1975

[54] PNEUMATIC/ELECTRO-PNEUMATIC INTERLOCK CIRCUITRY FOR DOUBLE-END CONTROL LOCOMOTIVE

[75] Inventor: Richard O. Burkett, Apollo, Pa.

[73] Assignee: Westinghouse Air Brake Company, Wilmerding, Pa.

[22] Filed: Aug. 26, 1974

[21] Appl. No.: 500,623

[52] U.S. Cl. .................................. 303/16; 303/20
[51] Int. Cl.² ......................................... B60T 13/68
[58] Field of Search ......................... 303/13, 15–17, 303/20

[56] References Cited
UNITED STATES PATENTS

| | | | |
|---|---|---|---|
| 3,260,553 | 7/1966 | Jeffrey | 303/16 |
| 3,374,035 | 3/1968 | Howard | 303/20 |
| 3,560,055 | 2/1971 | Worbois | 303/15 X |

Primary Examiner—Duane A. Reger
Attorney, Agent, or Firm—R. W. McIntire, Jr.

[57] ABSTRACT

A pneumatic/electro-pneumatic interface unit for providing safe brake control of a train having a locomotive arranged for double-end control. The interface unit includes means for sensing different operating conditions of the pneumatic brake valve device at each control station. The sensing means acts through interlock circuitry to assure that power is supplied only to the mastercontroller comprising the electro-pneumatic brake control means at the control station having the cut-in brake valve device, provided the brake valve device at the noncontrolling station is in its cut-out condition and is in handle-off position. With power supplied, the mastercontroller is enabled to control energization of brake application and release relays, which in turn control energization of the application and release train wires, according to the operating condition of the controlling brake valve device. In the event both brake valves are cut out and are in a handle-off position, additional interlock circuitry is provided to cut off power to each mastercontroller and instead connect power directly to the brake application relay to assure application of the train brakes independent of either mastercontroller.

10 Claims, 1 Drawing Figure

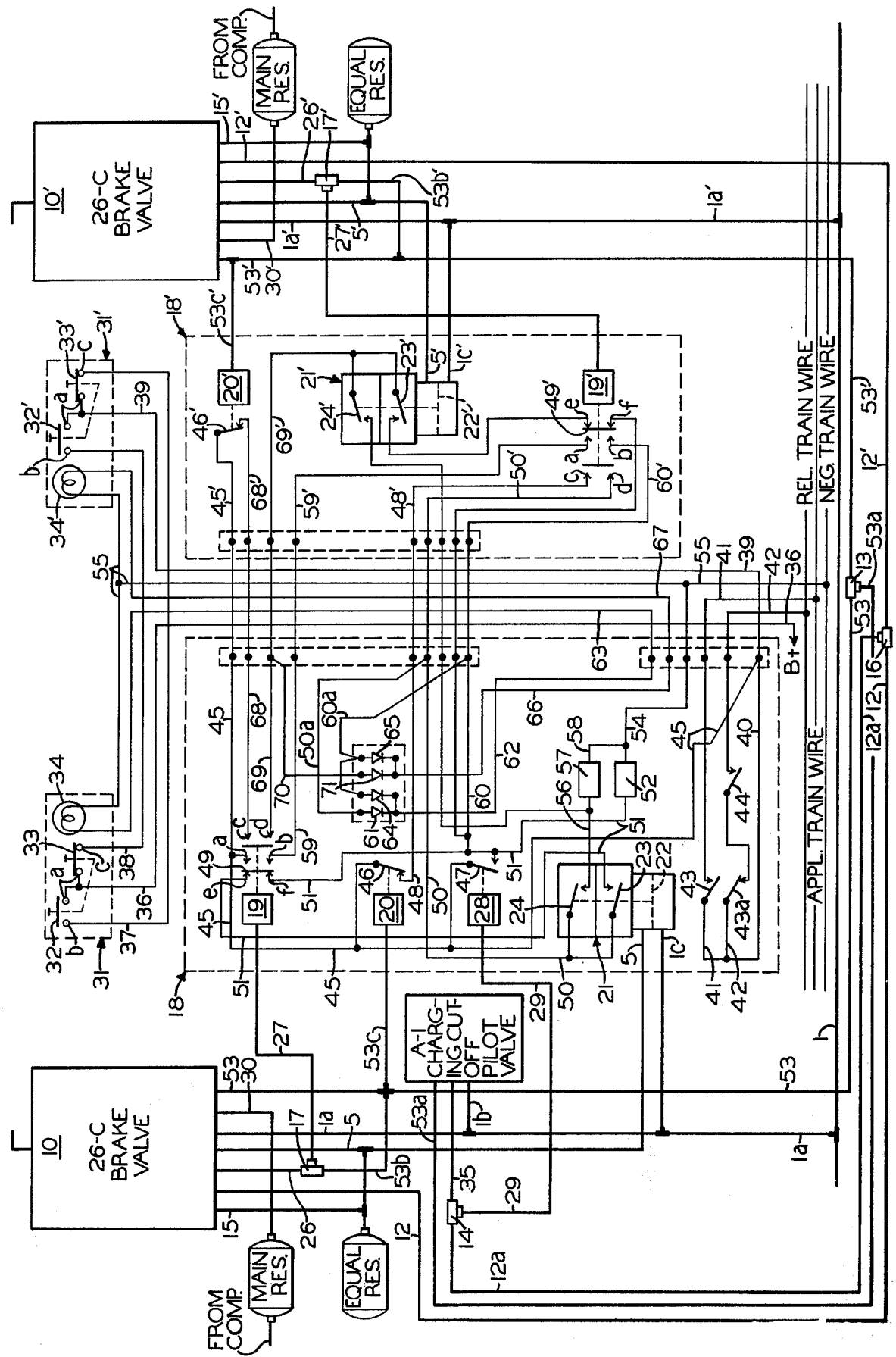

3,901,558

PNEUMATIC/ELECTRO-PNEUMATIC INTERLOCK CIRCUITRY FOR DOUBLE-END CONTROL LOCOMOTIVE

BACKGROUND OF THE INVENTION

In present day rail passenger service, the locomotives are typically arranged with two control stations so that either end of the locomotive may be designated the trailing end to which the cars of the train are coupled and the other end used for control purposes.

For purposes of brake control, a conventional, well-known 26–C type brake valve device may be employed at each control station. A complete description of the construction and operation of such a brake valve device may be found in instruction pamphlet G.g.5071-6, entitled "26 Type Brake Equipment For Locomotive," published by the Westinghouse Air Brake Company. A brake valve of the above-mentioned type is also disclosed in U.S. Pat. No. 2,958,561. The basic brake application and release function of this brake valve device is predicated on effecting a variation of brake pipe pressure according to the pilot pressure in an equalizing reservoir that is in turn varied by movement of the brake valve handle between release and full service positions. Due to the capacity limitation on the volume of this equalizing reservoir, in order to maintain the desired response characteristics of the brake valve, it will be appreciated that the distance between control stations at opposite ends of the locomotive requires that each control station be provided with a separate brake valve device and equalizing reservoir.

This brake valve device includes means for cutting out the brake pipe charging ability of the brake valve and a "handle off" position in which the brake valve handle must be placed in order to remove the handle. Since the handle must pass through the service brake application zone to reach handle off position, it will be appreciated that a full service reduction of brake pipe pressure will be assured in handle off position, so that a brake application is made on the train when the operator removes the handle from the brake valve at one control station before moving to the other control station.

These features are intended to provide a measure of safety, when standard operating procedures of the railroad industry are carried out. When it is desired to combine electro-pneumatic brake control with the pneumatic brake valve control, however, additional means for assuring safe operation of the equipment according to standard operating procedures is required.

SUMMARY OF THE INVENTION

It is therefore one object of the present invention to provide interlock circuitry which assures that when a brake valve device at the noncontrolling end of a locomotive is properly set in cut-off position with its handle removed, only the electro-pneumatic control means at the controlling end is enabled at the time the controlling brake valve at the controlling end is cut in.

It is another object of the invention to provide interlock circuitry assuring that an electro-pneumatic brake application is effective any time the brake valve device at both the controlling and noncontrolling end is set in cut-off position with its handle removed.

Still another object of the invention is to provide interlock circuitry for effecting an electro-pneumatic brake application to assist a brake valve or trainline initiated pneumatic emergency and as protection against a closed brake pipe cock.

Yet another object of the invention is to interrupt the electro-pneumatic release circuit when a brake valve or trainline initiated emergency application is in effect to prevent the electro-pneumatic mastercontroller from inadvertently counteracting the intended brake application by reason of false response of the mastercontroller.

In carrying out these objects, the present invention includes, in addition to a conventional pneumatic brake valve device at each control station of a locomotive, an interface unit at each end comprising interlock circuitry and a mastercontroller. The mastercontroller senses pressure differentials between brake pipe and equalizing reservoir pressures according to the brake control initiated by the brake valve connected thereto and effects appropriate control of application and release contacts controlling energization of electric trainline wires to which electromagnetic valves on each car are connected so as to nearly instantaneously duplicate on the several cars the brake control initiated by the brake valve device. In the present invention the brake control is in the form of a brake pipe reduction in response to which a car-carried control valve is operative to produce the desired brake pressure.

Each control station of the locomotive is provided with a power selector console, including a push-button switch and an indicator lamp, interconnected with each other so that power can be selectively applied or interrupted at the interface equipment from either control station of the locomotive, with a visual application at each control station of the application of such power.

A first pressure switch comprising interlock circuitry of the interface unit at the selected control station is connected to the pneumatic brake valve thereof to sense the cut-in condition of the brake valve and accordingly connects power to the interface unit at the opposite control station. Closure of a second pressure switch of the interface unit at this opposite end, which senses when the noncontrolling brake valve is cut out of operation and is in its handle off position, relays the electric power back to the selected control station mastercontroller, which is accordingly enabled to control energization of the brake application and release trainline wires according to the brake pipe/equalizing reservoir differential controlling operation of the mastercontroller. In this manner, an electrically controlled (mastercontroller) brake application is produced in parallel with the operator-controlled brake valve initiated application from the selected control station.

In the event neither brake valve is cut in, as when the operator is between control stations or has momentarily departed the locomotive, then said first pressure switch in each interface unit closes contacts establishing a circuit via which a brake application relay controlling energization of the application train wire is energized to automatically effect a full service brake application on the train to assure that the train remains in a stopped condition until such time as the brake valve at the selected control station is subsequently cut in.

A third pressure switch, which may be located in either one of the interface units is effective to energize said brake application relay, which also has contacts in the release train wire circuit to interrupt such circuit when either one of the pneumatic brake valves is moved to emergency position or when a break-in-two has occurred, as detected by a conventional valve device provided to monitor such an emergency or break-in-two.

This prevents a false brake pipe/equalizing reservoir pressure differential at the enabled mastercontroller from effecting an inadvertent release of the train brakes at the time an emergency brake application is in effect.

Other objects and attendant advantages of the invention will appear in the following more detailed description thereof when taken in conjunction with the accompanying single FIGURE drawing showing a circuit diagrammatic of the invention.

DESCRIPTION AND OPERATION

Referring now to the drawing, each control station of a double-end controlled locomotive is provided with a conventional 26–C type brake valve device 10 and 10', which may be connected by piping as shown and fully described in the previously mentioned instruction pamphlet. For the purpose of describing the present invention, only the pipe connections necessary for an understanding of the present invention are shown, such pipe connections being identified by reference numerals corresponding to those used in the instruction pamphlet since these numerals have become widely recognized.

Pipes 30–30' connect brake valves 10–10' to a main reservoir that is maintained charged by the locomotive compressor in a conventional manner. Main reservoir pressure at each brake valve is converted to a regulated pressure, which flows by way of pipe 15–15' to an equalizing reservoir. This equalizing reservoir pressure is fed via pipe 5-5' back to the brake valve 10–10' where it serves as control pressure in developing the desired brake pipe pressure supplied to trainline pipe 1 via pipes 1a–1a' of the respective brake valves. The remaining pipes 12–12', 26–26' and 53–53' are pressurized at the time the respective brake valves are placed in emergency, handle-off, and charging cut-out positions, respectively, as is well known.

The locomotive is further provided with an A-1 charging cut-off pilot valve 11, also shown and fully described in its construction and operation in the above-mentioned instruction pamphlet. A branch pipe 1b connects brake pipe pressure from pipe 1a to the charging cut-off pilot valve 11, while a pipe 53a leads from valve 11 to the outlet side of a reverse type double check valve 13 also shown and fully described in the above-mentioned instruction pamphlet. In addition, reverse type double check valve 13 is disclosed in U.S. Pat. No. 3,107,681. The opposing inlets of reverse check valve 13 are connected to pipes 53–53' leading to the respective brake valves 10–10'. Also leading from valve 11 is a pipe 35 that is connected to one inlet of a conventional double check valve 14 whose other inlet is connected to the outlet of a conventional double check valve 16 via pipe 12a. The opposing inlets of double check valve 16 are connected to pipes 12–12' leading to the respective brake valves 10–10'.

A reverse acting double check valve 17 similar to check valve 13 has one inlet connected to pipe 26 leading to brake valve 10 and the opposite inlet connected to a branch pipe 53b of pipe 53.

Each control station of the locomotive further includes interface units 18–18' comprising pressure switches 19–19', 20–20' and a mastercontroller device 21–21', which is shown and fully described in U.S. Pat. No. 3,573,409, issued Apr. 6, 1971, and assigned to the Westinghouse Air Brake Company. Since only a general knowledge of the manner in which this mastercontroller operates is deemed necessary for an understanding of the present invention, it need only be explained that pipes 5–5' and 1a–1a' from the respective brake valves 10–10' are connected to mastercontrollers 21–21'.

In order to avoid repetition, only mastercontroller 21 will be discussed, it being understood that mastercontroller 21' is identical in construction and is piped up and wired, as subsequently explained, in an identical manner. Mastercontroller 21 is connected to pipe 5 leading to brake valve 10 and the equalizing reservoir so as to be subject to the pressure of the equalizing reservoir on one side of a diaphragm piston 22 (shown by dotted lines) to which a pair of switches 23 and 24 are operatively connected. The other side of diaphragm piston 22 is subject to brake pipe pressure connected via a branch pipe 1c from brake pipe 1a. In the lap condition of the mastercontroller, as shown, the contacts of switches 23 and 24 are both open. A pressure differential resulting from a chosen predominance of brake pipe pressure over equalizing reservoir pressure results in upward deflection of diaphragm piston 22 to effect closure of switch 23, while downward deflection of diaphragm piston 22 responsive to a preselected differential in the opposite direction effects closure of switch 24.

Connected to pressure switch 19 via pipe 27 is the outlet of reverse acting double check valve 17. As hereinafter explained, check valve 17 is pressurized at its outlet only so long as fluid pressure is effective at both inlets concurrently. Connected to pressure switch 20 is a pipe 53c extending from pipe 53. These same pressure switch connections are made in an identical fashion relative to interface unit 18'.

In addition, interface unit 18 has another pressure switch 28, which is connected to the outlet of double check valve 14 via pipe 29.

Each control station of the locomotive still further includes a power selector and indicator console 31–31'. The respective power selector consoles comprise a pair of pushbutton operated, single-pole, double-throw switches 32–32' and 33–33', as well as an indicator lamp 34–34'. These switches of the respective power selector consoles 31–31' are wired in a three-way configuration, which permits an operator at either control station to control power to the interface unit 18–18' associated with that control station, as now explained.

In the shown switch positions of the respective power selector consoles 31–31', B+ is supplied via wire 36 to a common terminal interconnecting contacts (a) of switches 32 and 33. Open switch 32 interrupts supply of B+ to console 18' via its contacts (a–b) and wire 37, while closed switch 33 completes a circuit across its contacts (a–c) to connect B+ to contact (b) of switch 32' via wire 38 leading to console 31'. Switch 32' is open in the position shown to interrupt supply of B+ to feed wire 39 via the common terminal connecting contacts (a) of switches 32' and 33'. Consequently, feed wire 39 is deenergized so that power is cut off from interface unit 18.

If the push-button switch 32' of console 31' is depressed, the contacts (a–b) of switch 32' are closed and the contacts (a–c) of switch 33' are opened. B+ is then connected across contacts (a–b) of switch 32' to feed wire 39, which is tied to the terminal block of interface unit 18.

If, on the other hand, the operator depresses pushbutton 32 of console 31 at the opposite control station, the contacts (a–c) of switch 33 are opened to interrupt supply of B+ to wire 38, while concurrently switch 32 is closed connecting B+ from wire 36 to wire 37 via contacts (a–b) of closed switch 32 and thence to console 31' and via closed contacts (a–b) of switch 33' to energize feed wire 39.

At the terminal block of interface unit 18, B+ is connected from feed wire 39 to a branch wire 40 to which is connected a brake application control wire 41 and a brake release control wire 42. Application wire 41 includes a normally open contact 43, which interrupts supply of B+ to the application trainline wire via the interface unit terminal block. Accordingly, the application magnet valves (not shown) on each car of the train, as well as the locomotive, are deenergized. Release wire 42 includes a normally closed contact 43a and a normally open contact 44, which interrupts supply of B+ to the release trainline wire also via the interface unit terminal block, thereby deenergizing the release magnet valves (not shown) on each car and the locomotive.

From the terminal block connection of feed wire 39, B+ is also supplied via wire 45 to switch member 46 of pressure switch 20, to the switch member 47 of pressure switch 28, to the contact (e) of pressure switch 19, and via the terminal block of interface unit 18 to the terminal block of interface unit 18' associated with the opposite control station. From the terminal block of interface unit 18', wire 45' supplies B+ to the switch member 46' of pressure switch 20'.

Let it be assumed now that the train is being operated from the control station at the end of the locomotive having brake valve 10 and power selector console 31, hereinafter referred to as control station A. In order to set up control station A for control, the operator will, according to standard operating practices, install the brake valve handle and rotate it out of "handle off" position to "full service" position. The operator will also cut in the brake valve by proper positioning of the brake valve cut-off valve device provided for that purpose in a manner known in the art. The interlock circuitry comprising the invention is intended to assure that the operator follows this procedure in order to activate mastercontroller 21.

According to the conventional, well known operation of brake valve 10–10', pipe 53–53' and consequently branch pipe 53b–53b' is pressurized when brake valve 10–10' is operatively cut out and depressurized when brake valve 10–10' is cut in by manipulation of its manually positioned cut-off valve. Also, pipe 26–26' is pressurized in handle off position of the respective brake valve and depressurized when moved out of handle off position. In the absence of pressure at pressure switch 20, signifying the cut-in condition of brake valve 10, switch member 46 engages its contact to connect B+ via wire 48, the respective terminal blocks of interface units 18 and 18' and wire 48' to contact (c) of switch member 49' comprising pressure switch 19'.

Unless pressure switch 19' is pressurized, however, signifying that brake valve 10' is in handle off position and is operatively cut out, switch 49' maintains its contacts (c–d) open to interrupt B+. When properly set up as the noncontrolling brake valve by removal of its handle (which can only be accomplished in handle off position) and by having the brake valve cut-off valve positioned to interrupt charging so as to be in an operatively cut-out condition, pipe 26' and branch pipe 53b' are each pressurized to satisfy the AND logic requirement of reverse type double check valve 17' and thereby effect pressurization of pipe 27' and pressure switch 19'. Contacts (c–d) of pressure switch 19' are accordingly closed by switch member 49', when brake valve 10' is properly set up as the noncontrolling brake valve, to connect B+ to switches 23 and 24 of mastercontroller 21 via wire 50', the terminal blocks of the respective interface units 18–18' and wire 50.

By cutting in brake valve 10, as previously mentioned, so as to operate as the controlling brake valve, pipe 53 and consequently branch pipe 53b are depressurized. Switch member 49 of pressure switch 19 accordingly opens its contacts (a–b) and concurrently effects closure of contacts (e–f) in a wire 51 extending between the application contact of mastercontroller 21 and the winding of a brake application relay 52. The equipment is thus set up for operation by the controlling brake valve 10 at control station A with mastercontroller 21 being enabled to effect electro-pneumatic brake control, as hereinafter explained.

In operating brake valve 10 to effect a brake application, for example, a reduction of brake pipe pressure is produced at the brake valve, which is pneumatically propagated along the train. This reduction of brake pipe pressure is accomplished at brake valve 10 by effecting a reduction of equalizing reservoir pressure in pipe 5, it being well known that the pressure in brake pipe 1 is varied according to the equalizing reservoir pressure variation. Since the volume of the equalizing reservoir is very small relative to the volume of brake pipe 1, it will also be appreciated that at the time brake valve 10 is moved to service position, calling for a brake application, the reduction of equalizing reservoir pressure will be immediately reflected on one side of diaphragm piston 22 of mastercontroller 21 before any substantial reduction of brake pipe pressure occurs on the opposite side of diaphragm piston 22. Accordingly, a pressure differential results, forcing mastercontroller 21 to be actuated to a position in which switch 23 is closed. Closure of switch 23 connects B+ from wire 50 to wire 51 via the closed contacts (e–f) of pressure switch 19 to energize application relay 52, which is connected via wire 54 to wire 55 leading to the negative trainline wire. Relay 52 picks up the normally open contact 43 of the application relay to connect B+ from wire 40 to wire 41 and the trainline brake application wire. The car-carried application magnet valves (not shown) are accordingly energized to nearly instantaneously effect a local reduction of brake pipe pressure at each car under electro-pneumatic control in parallel with the conventional pneumatic transmission of the brake application via brake pipe 1.

When the brake pipe pressure accordingly decreases to the level of equalizing reservoir pressure, conventional self-lapping operation of brake valve 10 will terminate any further brake pipe reduction thereat, while concurrently the equalizing reservoir/brake pipe pressure differential across diaphragm 22 of mastercontroller 21 is balanced and contact 23 is opened to interrupt the supply of power to application relay 52, thereby also terminating any further electro-pneumatic reduction of brake pipe pressure under control of mastercontroller 21.

When it is desired to release the brake application in effect, the brake valve 10 is placed in release position, which results in an increase in the equalizing reservoir pressure according to conventional, well known operation of the brake valve 10. This increase in equalizing reservoir pressure produces a corresponding increase in brake pipe pressure at the brake valve and is concurrently reflected at diaphragm piston 22 of mastercontroller 21. Since the response to brake pipe pressure is slow compared to that of the equalizing reservoir pressure, a pressure diferential arises across diaphragm piston 22 to deflect the diaphragm in a downward direction to effect closure of switch 24. In this position of mastercontroller 21, power is supplied via the closed switch 24 and wire 56 to brake release relay 57 whose winding is energized via wire 58, wire 54 and wire 55 leading to the negative trainline wire. Normally open contact 44 is consequently picked up to connect B+ to wire 42 and the brake release trainwire. Car-carried release magnet valves (not shown) are accordingly energized to nearly instantaneously introduce a local supply of pressure to brake pipe 1 at each car under electro-pneumatic control in parallel with the conventional supply of brake pipe pressure by the controlling brake valve 10.

From the foregoing, it will be appreciated that in the event brake valve 10' at the opposite end of the locomotive, hereinafter referred to as control station B is tampered with by someone operating the brake valve cut-off valve to cut in the brake valve, for example, actuation of pressure switch 19' will be lost, due to the fact that pipes 53', 53b' and consequently pipe 27' become depressurized. Contacts (c–d) of pressure switch 19' are accordingly opened to interrupt the supply of B+ to mastercontroller 21 at control station A via wire 50 and thereby cut out electro-pneumatic control from station A. In cutting out electro-pneumatic control of the train brakes, the operator is assured more positive brake control to counteract any inadvertent brake release by manipulating controlling brake valve 10 at control station A.

When it is necessary to change control stations, it is desirable to obtain a brake application on the train to prevent a "runaway" while the operator is in the process of moving from station A to station B, for example. Such a runaway could result if a release magnet valve on one of the cars would fail in an open position so as to supply fluid pressure to brake pipe 1 at the time both brake valves 10 and 10' are in a charging cut-out condition. In order to counteract this increase in brake pipe pressure, an electro-pneumatically controlled dumping of brake pipe pressure is provided to assure complete venting of pressure from brake pipe 1.

This is accomplished at the time of changing control stations by placing the handle of brake valve 10 at control station A in handle off position and operating its cut-off valve to cut-out position. Accordingly, pipes 53 and 26 of brake valve 10 are pressurized to actuate pressure switch 19 by virtue of pipe 27 becoming pressurized in response to the AND logic of reverse double check valve 17 being satisfied. In the actuated condition of pressure switch 19, its contacts (a–b) are closed to connect B+ from wire 45 to wire 59 of interface unit 18, the respective interface terminal blocks and wire 59' of interface unit 18'. Since corresponding contacts (1–b) of pressure switch 19' at control station B are also closed due to brake valve 10' having been previously placed in handle off position and operatively cut out, as previously explained, power is connected via closed contacts (a–b) of pressure switch 19', wire 60' of interface unit 18', the respective interface terminal blocks, wire 60 of interface unit 18 and wire 51 to brake application relay 52. As previously explained, energization of relay 52 in turn energizes the train application wire to operate the application magnet valves on each car. These valves assure that the brake pipe is open to atmosphere and accordingly a brake application is provided, even if a release magnet valve should fail, as above mentioned.

It should be mentioned at this time that indicator lamp 34 of power selector console 31 had been initially illuminated (when power was obtained at mastercontroller 21) due to B+ being connected from wire 50 via a branch wire 50a, a diode 61, wire 62, the terminal block of interface unit 18, a wire 63, lamp 34 and wire 55 leading to the negative train wire.

With both brake valves 10 and 10' cut out when changing control stations and an electro-pneumatically controlled brake application in effect, as previously explained, both indicator lamps 34 and 34' become illuminated. A branch wire 60a connects B+ from wire 60 to indicator lamp 34 via a diode 64 in parallel with diode 61, and concurrently to indicator lamp 34' via a diode 65, a wire 66, the terminal block of interface unit 18 and a wire 67. The separate indicator lamps are thus lit through an interlock circuit which is energized only when both brake valves 10, 10' at the respective control stations A and B are in a cut-out condition with their operating handles removed. When either one of the brake valves 10, 10' is cut in, this interlock circuit is interrupted and the interlock circuit via which power is connected to the mastercontroller at the controlling station serves to energize the indicator lamp at that control station only.

Upon arriving at control station B, the operator attaches the brake valve handle in a well known manner to brake valve 10', moves the handle from handle off position to full service position, and cuts in the brake valve by proper positioning of the brake valve cut-off valve. Accordingly, pressure is vented from pipes 53' and 26' to effect deactuation of pressure switches 19' and 20'. Contacts (a–b) are opened by switch 49' of pressure switch 19' to interrupt the interlock circuit heretofore connecting B+ to the application relay 52. Concurrently, the contacts of pressure switch 20' are closed by switch 46' to connect B+ to the mastercontroller 21' of interface unit 18' via a wire 68', the terminal blocks of the respective interface units 18' and 18, a wire 68, the closed contacts (c–d) of pressure switch 19 (indicative of the cut-out condition of brake valve 10) a wire 69, the terminal blocks of the respective interface units 18 and 18' and a wire 69'. Mastercontroller 21' is thus provided with power for effecting electro-pneumatic control of the brakes from control station B in response to the effective pressure differential to which diaphragm piston 22' responds whenever brake valve 10' is operated, as previously explained with respect to mastercontroller 21.

At the time power is supplied to mastercontroller 21', power is also connected from wire 69 to a branch wire 70 and a diode 71 in parallel with diode 65, wire 66 and wire 67 to indicator lamp 34', which is accordingly illuminated as an indication that power is supplied to mastercontroller 21'. Since contacts (a–b) of pressure switch 19' are open, as previously mentioned, wires 60', 60 and 60a are deenergized as are wires 50', 50 and 50a by reason of contacts (c–d) of pressure switch 19' being open, so that each circuit via which lamp 34 may be illuminated is interrupted from B+ and lamp 34 is accordingly extinguished. Lamp 34', however, remains lit by reason of mastercontroller 21' being enabled.

With power supplied to mastercontroller 21', conventional operation of brake valve 10' at control station B will effect energization of the trainline application or release wire in the same manner as provided by brake valve 10 from control station A.

In the event of a train break-in-two or a brake valve initiated emergency brake application from either brake valve 10 or 10', the resultant brake pipe reduction will create a pressure differential across diaphragm pistons 22, 22' of the respective mastercontrollers, which are accordingly actuated in a brake release direction. Since a break-in-two or brake valve initiated emergency is intended to produce a brake application on the train, it is apparent that operation of the controlling mastercontroller to effect a brake release would counteract the intended brake application. In order to avoid the possibility of such a failure, due to false response of the mastercontroller, pressure switch 28 of interface unit 18 is actuated in response to pressurization of pipe 29 via double check valve 14 at the time either pipe 12a or pipe 35 is pressurized. Pipe 35 is pressurized when a sufficiently fast rate of reduction of brake pipe pressure occurs at pipe 1b of charging cut-off pilot valve 11 indicative of a train break-in-two occurring, while pipe 12a is pressurized via double check valve 16 when either pipe 12 of brake valve 10 or pipe 12' of brake valve 10' is pressurized by movement of the brake valve handle to emergency position.

Actuation of pressure switch 28 effects closure of switch 47 thereof to connect B+ from wire 45 to application relay 52 via wire 51. With application relay 52 energized, normally closed contact 43a in wire 42 is opened to interrupt energization of the trainline release wire irrespective of any false mastercontroller operation to thereby assure an electro-pneumatic brake assist due to energization of the trainline application wire by reason of contact 43 of application relay 52 being picked up at the same time as contact 43a is picked up.

From the foregoing, it will be appreciated that the interlock circuitry of the invention will not only enforce standard railroad operating procedures for double-end control when operating electro-pneumatic/pneumatic brake equipment, but will also assure safe operation of such equipment.

Having now described the invention what I claim as new and desire to secure by Letters Patent, is:

1. In a train having a locomotive with a control station at each end, a combined pneumatic and electro-pneumatic brake control system including:
   a. a brake pipe extending through the train, the pressure variation carried in said brake pipe controlling the train brakes;
   b. an equalizing reservoir at each control station;
   c. a brake valve at each control station comprising:
      i. an operating handle movable from a brake release position through a brake application zone, in which said equalizing reservoir at the same control station is charged with fluid pressure according to the position of the handle in the brake application zone, to a handle-off position and an emergency position;
      ii. relay valve means subject to said equalizing reservoir pressure at said same control station for controlling the fluid pressure in said brake pipe; and
      iii. cut-off valve means operable to establish a cut-out condition of said brake valve by interrupting the variation of pressure in said brake pipe by said relay valve means; and
   d. a mastercontroller device at each control station subject opposingly to said brake pipe pressure and said equalizing reservoir pressure at the same control station, and having a normally open application switch and a normally open release switch, one or the other of which is actuated when a pressure differential arises between said brake pipe and equalizing reservoir pressures, depending upon the sense of said pressure differential;
   e. a brake application wire extending through said train to provide electrical control of pressure in said brake pipe so as to effect variation thereof in a first sense;
   f. a brake release wire extending through said train to provide electrical control of pressure in said brake pipe so as to effect variation thereof in a sense opposite said first sense;
   g. a source of electric power; and
   h. interlock means for establishing a first circuit via which electric power is connected from said source to said mastercontroller at one of said control stations only when said brake valve thereat is cut in and said brake valve at the other control station is cut out and is in handle-off position, thereby to enable said mastercontroller at said one of said control stations to control energization of said application and release wires via said application and release contacts according to the sense of said brake pipe/equalizing reservoir pressure differential thereat.

2. The system as recited in claim 1, further comprising interlock means for establishing a second circuit to which said source of electrical power is connected to control energization of said application wire only when said brake valve at each of said control stations is in said cut-out condition and is in said handle-off position.

3. The system as recited in claim 2, further comprising interlock means for establishing a third circuit to which said source of electric power is connected to control energization of said application wire only when an emergency brake application is made.

4. The system as recited in claim 3, further comprising:
   a. said brake application and release wires having a constant connection with said source of electrical power;
   b. a brake application relay connected to said application switch of said mastercontroller at each of said control stations and to said second and third circuits for energization thereby, and having a normally open contact in said application wire to interrupt energization thereof except when said application relay is energized; and c. a brake release relay connected to said release switch of said mastercontroller at each of said control stations, and having a normally open contact in said release wire to interrupt energization thereof except when said release relay is energized, said application relay having a normally closed contact in said release wire in series with said normally open contact therein to prevent energization of said release wire whenever said application relay is energized.

5. The system as recited in claim 2, further comprising three-way switch means for controlling application of electric power from said source to said brake control system from either of said control stations.

6. The system as recited in claim 5, further comprising an indicator light at each of said control stations connected in parallel with said first and second circuits for providing a visual indication of when said three-way switch means is providing power to said brake control system.

7. The system as recited in claim 6, further comprising diode means for preventing the feedback of energizing current from one of said first and second circuits to the other.

8. The system recited in claim 1, further comprising:
a. pneumatic AND logic means subject at one input to a fluid pressure signal provided when said brake valve at said other control station is in said handle-off position and subject at the other input to a fluid pressure signal provided when said brake valve at said other control station is in said cut-out condition; and
b. said interlock means including:
 i. a first pressure switch operable responsive to a fluid pressure signal provided when said brake valve at said one control station is in said cut-in condition to effect closure of a first contact in said first circuit; and
 ii. a second pressure switch operable responsive to a fluid pressure signal provided by said pneumatic logic means when a fluid pressure signal is present at both said one and said other inputs thereof to effect closure of a second contact in said first circuit to complete said first circuit.

9. The system recited in claim 2, further comprising:
a. first and second AND logic means each operative to provide a fluid pressure output signal responsive to a respective one of said brake valves being in said handle-off condition in which a fluid pressure signal is provided at one input of said logic means and in a cut-out condition in which a fluid pressure signal is provided at the other input; and
b. said interlock means via which said second circuit is established including first and second pressure switches operable responsive to said fluid pressure output signal provided by a respective one of said first and second logic means, to effect closure of a first set of contacts of said first and second pressure switches to complete said second circuit.

10. The system as recited in claim 3, further comprising:
a. means for sensing an emergency rate of reduction in the pressure of said brake pipe;
b. a double check valve having one input subject to a fluid pressure signal provided by said emergency sensing means, another input subject to a fluid pressure signal provided by either one of said brake valves when moved to said emergency position, and an output for providing a fluid pressure signal when either one of said inputs thereof is pressurized; and
c. said interlock means for establishing said third circuit being a pressure switch operable responsive to said output signal from said double check valve to effect closure of a contact to complete said third circuit.

* * * * *